M. P. SHIELDS.
Safety-Bit for Bridles.
No. 216,230. Patented June 3, 1879.
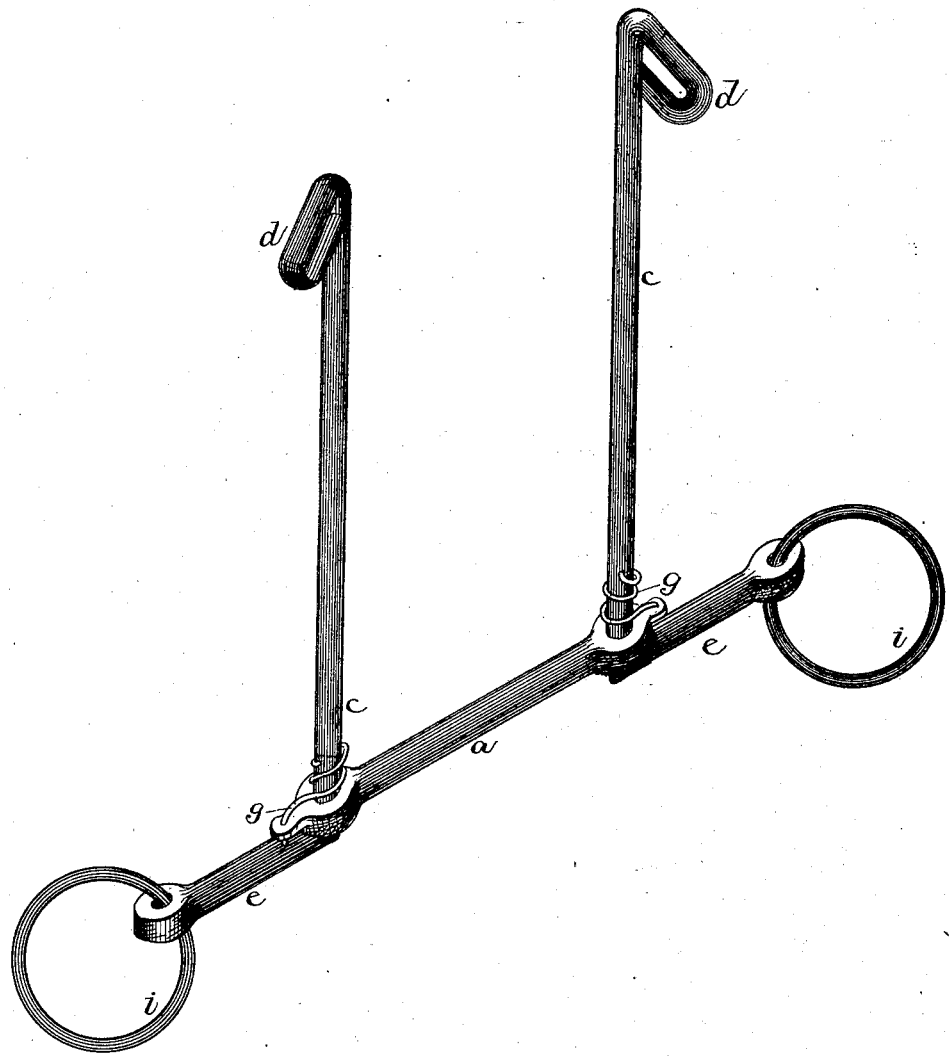
Witnesses:
J. W. Garner
W. S. D. Haines
Inventor:
M. P. Shields,
per
F. A. Lehmann,
atty.

UNITED STATES PATENT OFFICE.

MAXWELL P. SHIELDS, OF FAIRFIELD, PENNSYLVANIA.

IMPROVEMENT IN SAFETY-BITS FOR BRIDLES.

Specification forming part of Letters Patent No. 216,230, dated June 3, 1879; application filed April 30, 1879.

*To all whom it may concern:*

Be it known that I, M. P. SHIELDS, of Fairfield, in the county of Adams and State of Pennsylvania, have invented certain new and useful Improvements in Safety-Bits; and I do hereby declare the following to be a full, clear, and exact description of the invention, such as will enable others skilled in the art to which it pertains to make and use it, reference being had to the accompanying drawing, which forms part of this specification.

My invention relates to an improvement in bridle-bits; and it consists in the combination of a rigid bit and two cranked rods, which extend along up the side of the horse's head, and which, when operated upon by the reins, turn in the ends of the bit, so as to force the loops on their upper ends into the horse's jaws, as will be more fully described hereinafter.

The accompanying drawing represents a perspective of my invention.

$a$ represents a bar-bit, which may be made in the form here shown, or any other that may be preferred, and which has a hole made through each end for a cranked rod, $c$, to pass through. These two rods extend any desired distance up above the top of the bit, along the sides of the horse's head, and have the loops $d$ formed upon their upper ends, and into which the headstalls of the bridle are fastened. As these loops are also intended to catch into the sides of the horse's jaws should it attempt to run away, they are formed entirely to one side of the rod, and at very near a right angle to the cranks $e$, formed on the lower ends of the rods. By increasing the length of these loops in proportion to the viciousness of the horse to be dealt with, the most unruly horse can be always held in check with comparative ease.

In order to so hold the rods that the loops will not bear against the sides of the horse's jaws unnecessarily, or even when a slight pull is made upon the reins, the coiled springs $g$ are used, which have one end fastened to the bit and the other to the rod. These springs keep the rods so turned that the loops stand outward at an angle from the sides of the horse's head until forced inward by a pull on the reins, and as soon as the pull is released the springs throw the loops outward again.

The cranks $e$ project outward from the horse's mouth almost in line with the bit, and have the bridle-rings $i$ fastened in their outer ends, and to which the ends of the reins are buckled. The greater the length of these cranks the greater the power with which the loops may be forced into the sides of the horse's head.

Owing to the leverage of the cranks, the loops will be forced between the molar teeth of the horse with such force that the most vicious animal, however much he may be determined to run away, will be forced to open his jaws. When he does this he can be readily mastered.

Having thus described my invention, I claim—

1. In a bit, the rods $c$, passing through the end of the bit $a$, and having a rotary movement, and provided with the loops $d$, to catch in the sides of the horse's jaws, substantially as shown.

2. The combination of the bit $a$, springs $g$, and rods $c$, having the loops $d$ and cranks $e$, substantially as described.

In testimony that I claim the foregoing I have hereunto set my hand this 24th day of April, 1879.

M. P. SHIELDS.

Witnesses:
A. C. MUSSELMAN,
D. B. RILEY.